US010817769B2

(12) United States Patent
Kwang et al.

(10) Patent No.: US 10,817,769 B2
(45) Date of Patent: Oct. 27, 2020

(54) SMART TAG AND OBJECT RECOGNITION SYSTEM USING THE SAME

(71) Applicants: Hyundai Motor Company, Seoul (KR); Kia Motors Corporation, Seoul (KR)

(72) Inventors: Tae Woo Kwang, Hwaseong-si (KR); Sung Wook Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/674,975

(22) Filed: Nov. 5, 2019

(65) Prior Publication Data

US 2020/0143221 A1    May 7, 2020

(30) Foreign Application Priority Data

Nov. 7, 2018   (KR) .......................... 10-2018-0136111

(51) Int. Cl.
*G06K 19/07* (2006.01)
*G06K 19/077* (2006.01)
(Continued)

(52) U.S. Cl.
CPC ....... *G06K 19/07758* (2013.01); *B62D 65/00* (2013.01); *G01S 11/02* (2013.01);
(Continued)

(58) Field of Classification Search
CPC ........... G06K 7/10297; G06K 7/10306; G06K 7/10366; G06K 19/0723; G08B 13/2428;
(Continued)

(56) References Cited

U.S. PATENT DOCUMENTS

| 2007/0205867 A1* | 9/2007 | Kennedy | ............... H04W 99/00 340/10.1 |
| 2008/0030359 A1* | 2/2008 | Smith | ...................... G07C 9/28 340/686.1 |

(Continued)

FOREIGN PATENT DOCUMENTS

| JP | 2005-341146 A | 12/2005 |
| KR | 10-1105009 B1 | 1/2012 |
| KR | 10-1416373 B1 | 7/2014 |

*Primary Examiner* — Andrew W Bee
(74) *Attorney, Agent, or Firm* — Morgan, Lewis & Bockius LLP

(57) ABSTRACT

A passive smart tag attached for recognition of a part may include an antenna configured to receive electromagnetic wave from a reader; a no power circuit connected to the antenna and configured to amplify driving power generated by an electromagnetic induction phenomenon when the electromagnetic wave is received from the antenna; a radio frequency identification circuit connected to the no power circuit and configured to read tag identification information related to the smart tag stored in a memory according to the driving power to transmit the tag identification information to the reader; and an ultra-wideband circuit connected to the no power circuit and configured to generate an ultra-wideband signal used for recognition of a tag position in a response to the driving power to transmit the ultra-wideband signal to the reader.

15 Claims, 6 Drawing Sheets

(51) Int. Cl.
*G06K 7/10* (2006.01)
*B62D 65/00* (2006.01)
*H04L 27/06* (2006.01)
*G01S 11/02* (2010.01)
*G01S 13/82* (2006.01)

(52) U.S. Cl.
CPC ........ *G01S 13/825* (2013.01); *G06K 7/10366* (2013.01); *G06K 19/0723* (2013.01); *H04L 27/06* (2013.01)

(58) Field of Classification Search
CPC ............ G08B 13/2431; G08B 13/2462; G01S 13/767; G01S 13/825
See application file for complete search history.

(56) References Cited

U.S. PATENT DOCUMENTS

2016/0178727 A1* 6/2016 Bottazzi .................... G01S 5/10
375/130
2020/0143221 A1* 5/2020 Kwang .............. G06K 7/10366

\* cited by examiner

Smart tag

SMART TAG AND OBJECT RECOGNITION SYSTEM USING THE SAME

CROSS-REFERENCE TO RELATED APPLICATION

The present application claims priority to Korean Patent Application No. 10-2018-0136111 filed on Nov. 7, 2018, the entire contents of which is incorporated herein for all purposes by this reference.

BACKGROUND OF THE INVENTION

Field of the Invention

The present invention relates to a smart tag and an object recognition system using the same, and more particularly, to a smart tag that supports or performs a function for identifying an object and a function for recognizing position of the object by improving passive radio frequency identification (RFID) and an object recognition system (or an object recognition device) using the smart tag.

Description of Related Art

In general, radio frequency identification (RFID), unlike a conventional bar code, identifies an object, which the RFID is attached to, through non-contact method using radio frequency (RF). The RFID attached to the object stores identification information (ID) in an RF tag including an antenna and a chip and recognizes the ID through a reader.

The RFID is classified into active type and passive type according to a method of obtaining an energy source of a radio wave transmitted from the tag.

The active RFID may perform long distance transmission by obtaining transmission energy from its built-in battery, but it is expensive and is not suitable for identification of a plurality of parts due to limited battery life.

The passive RFID obtains transmission energy for the ID transmission from the radio wave received from the reader without a separate battery, has a semi-permanent lifetime, and is cheap in price. However, transmission distance of the radio wave of the passive RFID is short.

A vehicle factory manufactures a vehicle by assembling various parts and various types of vehicles are assembled in one production line. Since different types of parts are applied to a same vehicle type according to a specification or an option of the vehicle, tags for identifying the parts are attached to the parts. To efficiently manage an inventory or supply of the parts in the factory and to prevent or inspect misplacement or no installation of the parts for each vehicle, it is necessary to identify identification information (ID) of the parts as well as to recognize positions of the parts.

A conventional passive RFID tag may not easily recognize positions of the parts since the passive RFID tag transmits only the ID of the parts and has a short transmission distance that a radio wave of the passive RFID tag travels.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a smart tag that may include an ultra-wideband (UWB) circuit for recognition of a position of the tag in a passive radio frequency identification (RFID) tag and supplies power through a no power circuit to identify an object and recognize position of the object and to provide an object recognition system using the smart tag.

An exemplary embodiment of the present invention may provide the passive smart tag attached for recognition of a part, including: an antenna configured to receive electromagnetic wave from a reader; a no power circuit connected to the antenna and configured to amplify driving power generated by an electromagnetic induction phenomenon when the electromagnetic wave is received from the antenna; a radio frequency identification circuit connected to the no power circuit and configured to read tag identification information related to the smart tag stored in a memory according to the driving power to transmit the tag identification information to the reader; and an ultra-wideband circuit connected to the no power circuit and configured to generate an ultra-wideband signal used for recognition of a tag position in a response to the driving power to transmit the ultra-wideband signal to the reader.

The tag identification information and the part information including at least one of production date, production company information, applied vehicle type, or specification information related to the part may be stored in the memory.

The antenna may be configured to receive electromagnetic wave from the reader and to transmit information transmitted from the RFID circuit and the UWB circuit to the reader.

The no power circuit may include: a first voltage multiplier configured to amplify an alternating current voltage applied thereto when the electromagnetic wave is received therein and to convert the alternating current voltage to a direct current voltage to output the driving power; a limiter configured to limit the direct current voltage so as not to exceed a maximum voltage required for driving the radio frequency identification circuit and the ultra-wideband circuit; a reference generator configured to generate a reference voltage required for driving the radio frequency identification circuit and the ultra-wideband circuit in order not to generate an overvoltage; and a regulator configured to regulate voltage magnitude of the driving power in accordance with the reference voltage so that the regulator supplies stable driving power to the radio frequency identification circuit and the ultra-wideband circuit.

The voltage multiplier may be configured to generate a maximum electric power that is used in the radio frequency identification circuit, the ultra-wideband circuit, and at a least one capacitor connected to an output terminal of the regulator.

The no power circuit may further include a second voltage amplifier configured to further amplify the driving power output from the regulator and supply the amplified driving power to the ultra-wideband circuit.

The radio frequency identification circuit may include: an amplitude shift keying demodulator configured to convert an analog signal received from the electromagnetic wave into a digital signal and extract an operation command signal from the digital signal to transmit the operation command signal to the memory; a clock generator configured to generate a clock signal for synchronizing the radio frequency identification circuit with the memory in a response to an output voltage of the electromagnetic wave; and a backscattering modulator configured to modulate a signal including the tag identification information transmitted from the memory to transmit a modulated signal through the antenna.

The radio frequency identification circuit may be configured to reflect an electromagnetic wave energy received from the reader using the backscattering modulator to transmit a signal transmitted from the memory.

The memory may be configured to transmit the signal including the tag identification information and information related to the part to the backscattering modulator in a response to the clock signal when the operation command signal is received in the memory.

The ultra-wideband circuit may include: a data generator configured to generate a digital ultra-wideband signal for the recognition of the tag position using the driving power; a switch driver configured to amplify a pulse value for long-distance transmission of the ultra-wideband signal by driving a switch; a delay component configured to generate a delay signal for determining pulse bandwidth and transmission power of the ultra-wideband signal in accordance with amplitude of transmission frequency; a discharge switch and a charge switch configured to determine amplitude size of a pulse of the ultra-wideband signal output according to control of the switch driver; and a pulse generator configured to generate pulse shape and pulse size of the ultra-wideband signal to transmit the generated pulse shape and the pulse size of the ultra-wideband to the reader through the antenna.

Transmission distance of the ultra-wideband signal may be changed according to the amplitude size of the pulse of the ultra-wideband signal.

The smart tag may be coated with a bar code label that covers an upper side of the smart tag and may include a bar code matched with the tag identification information, and a sticker for attaching the smart tag to the part may be bonded to a lower side of the smart tag.

An exemplary embodiment of the present invention may provide the object recognition system configured to recognize part information and position information related to parts of a vehicle assembled in a vehicle production factory, including: passive smart tags attached for recognition of the parts, wherein each of the smart tags may include an antenna configured to receive electromagnetic wave from a reader, a no power circuit connected to the antenna and configured to amplify driving power generated by an electromagnetic induction phenomenon when the electromagnetic wave is received, a radio frequency identification circuit connected to the no power circuit and configured to read tag identification information related to the smart tag stored in a memory according to the driving power to transmit the tag identification information to the reader, and an ultra-wideband circuit connected to the no power circuit and configured to generate an ultra-wideband signal used for recognition of a tag position in a response to the driving power to transmit the ultra-wideband signal to the reader; readers that are disposed in the factory and recognize the smart tags via wireless communication; and a server configured to detect the part information and the position information related to the smart tags based on identification information and ultra-wideband signals of the smart tags received from the readers.

Each of the readers may be configured to transmit the tag identification information, information related to each of the parts, and distance information included in each of the ultra-wideband signals received from each of the smart tags to the server.

The server may include a position tracker configured to store coordinates of the readers disposed in the factory, and the server may be configured to recognize the position information related to the smart tags through triangulation in which the tag identification information and the ultra-wideband signals of the smart tags of the readers are used using the position tracker.

The smart tag and the object recognition system using the same according to the exemplary embodiment of the present invention may generate a maximum electric power in the no power circuit of the passive smart tag and may consume minimum electric power in the radio frequency identification (RFID) circuit and the UWB circuit. Thus, parts information and position information related to the object to which the smart tag is attached may be provided through the reader.

The exemplary embodiment of the present invention may permanently attach the smart tag to the parts of the vehicle to identify the parts of the vehicle and track position information related to the parts in the vehicle factory through the reader. Therefore, the exemplary embodiment of the present invention may easily manage an inventory of the parts and supply of the parts according to a process line of the vehicle.

Furthermore, the exemplary embodiment of the present invention may prevent misplacement or no installation of the parts according to the specification of the vehicle assembled in one production line and may automatically identify all parts information applied to the vehicle in the vehicle inspection process to detect misplacement or no installation of the parts.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
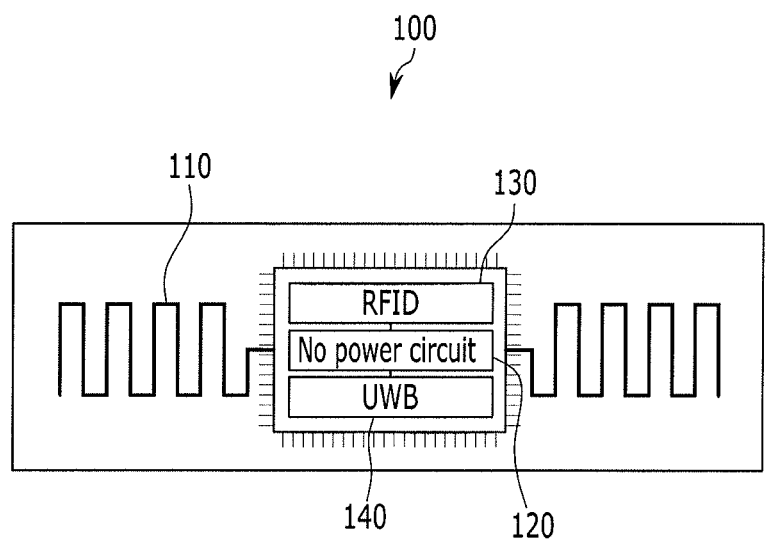
FIG. 1 represents a smart tag according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and may be implemented by hardware components or software components and combinations thereof.

Throughout the specification, radio frequency identification (RFID) may mean a passive RFID tag unless otherwise noted.

A smart tag and an object recognition system using the same according to an exemplary embodiment of the present invention will now be described in detail with reference to the drawings.

FIG. 1 represents the smart tag according to an exemplary embodiment of the present invention.

Figure 2A:
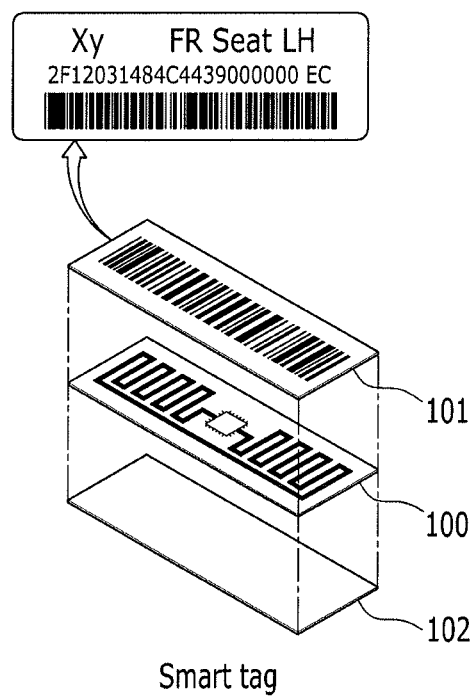
FIG. 2A shows an exploded perspective view and FIG. 2B shows a usage example of the smart tag according to an exemplary embodiment of the present invention.
Figure 2B:
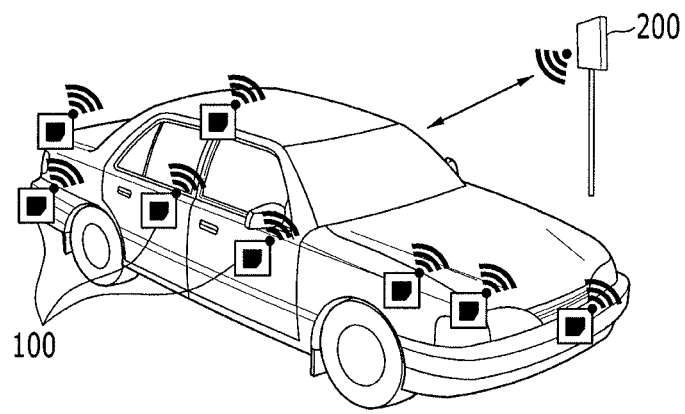

FIG. 2A shows an exploded perspective view and FIG. 2B shows a usage example of the smart tag according to an exemplary embodiment of the present invention.

Referring to FIG. 1 and FIGS. 2A and 2B, the smart tag 100 may be attached to a part (or an object) without a battery. The smart tag 100 may be a passive RFID tag configured for transmitting the tag identification information (the tag ID or the part ID) and position information related to the tag to a reader 200.

The smart tag 100 may include an antenna 110, a no power circuit 120, a radio frequency identification (RFID) circuit 130, and an ultra-wideband (UWB) circuit 140.

The antenna 110 may include a zig-zag type chip antenna, may receive electromagnetic wave from the reader 200, and may transmit information transmitted from the RFID circuit 130 and the UWB circuit 140 to the reader 200.

When the electromagnetic wave is received through the antenna 110, the no power circuit 120 may amplify driving electric power generated by an electromagnetic induction phenomenon to supply the amplified driving power to each circuit 130 or 140. The no power supply circuit 120 may generate a maximum electric power required for driving each the circuit by optimizing or adjusting a number of capacitors that are included in the no power supply circuit and store the driving power.

The RFID circuit 130 may transmit the tag ID and the part information to the reader 200 through the antenna 110 when the driving power is supplied to the RFID circuit.

The UWB circuit 140 may generate a UWB signal used for recognition of a tag position when the driving power is supplied to the UWB circuit and may transmit the UWB signal to the reader 200 through the antenna 110. The UWB circuit 140 may transmit position information related to the smart tag 100.

The antenna 110 may collect the tag ID, the part information, and the UWB signal to transmit the collected information to the reader 200.

The smart tag 100 may be configured in a form of a semiconductor chip in which the no power circuit 120, the RFID circuit 130, and the UWB circuit 140 are integrated into one, and the antenna 110 may be disposed in a form connected to both sides of the semiconductor chip.

The smart tag 100 may be coated with a bar code label 101 that covers an upper side of the smart tag and includes a bar code matched with the tag ID which is identification information related to the part, and a sticker 102 for attaching the smart tag to the part may be bonded to a lower side of the smart tag. The smart tag 100 may be a tag permanently attached to the part and may be a low cost passive RFID tag to which the UWB circuit 140 for identifying or transmitting position of the smart tag and the no power circuit 120 for supplying the driving power to the UWB circuit are added.

Figure 3:
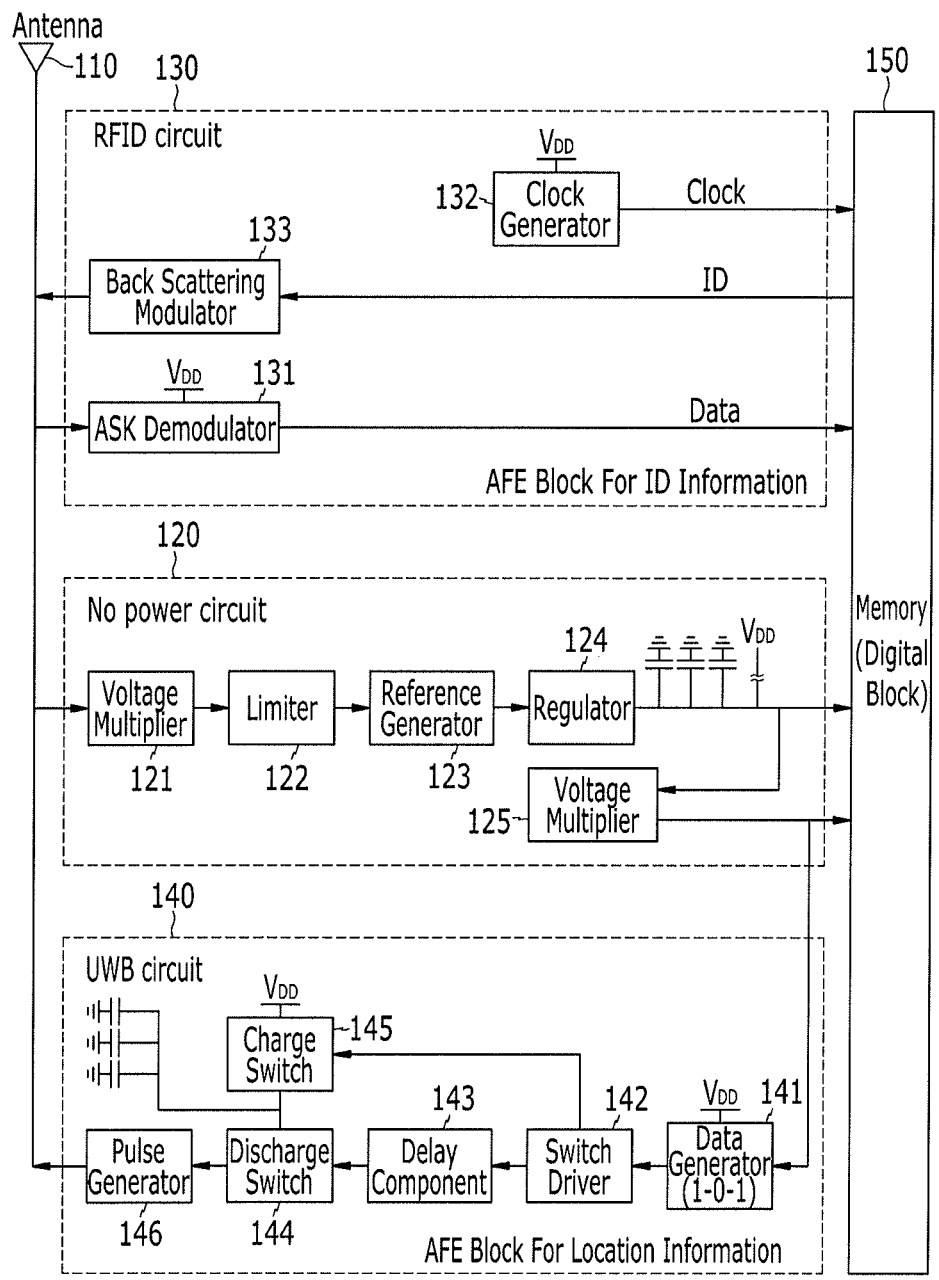
FIG. 3 shows detailed configuration of the smart tag according to an exemplary embodiment of the present invention.

FIG. 3 shows detailed configuration of the smart tag according to an exemplary embodiment of the present invention.

Referring to FIG. 3, the smart tag 100 may include the antenna 110, the no power circuit 120, the RFID circuit 130, the UWB circuit 140, and a memory 150.

The antenna 110 may receive an amplitude shift keying (ASK) signal and power electromagnetic wave from the reader 200 to transfer the received signals to the RFID circuit 130 and the no power circuit 120 and may transmit the tag ID and a UWB pulse wave for recognition of the tag position in a response to the received signals.

The memory 150 may include a digital block in which the tag ID and the part information are stored. The memory 150 may store the part information such as identification information (ID), production date, production company information, applied vehicle type, or specification information related to the part. For example, the part information may be stored as 2K bytes.

The no power circuit 120 may include a voltage multiplier (or a voltage amplifier) 121, a limiter 122, a reference generator 123, and a regulator 124.

The voltage multiplier 121 may amplify an alternating current (AC) voltage applied to the voltage amplifier when the electromagnetic wave is received in the voltage multiplier and may convert the AC voltage to a direct current (DC) voltage to output the driving electric power. The voltage multiplier 121 may generate a maximum electric power which is used in each the circuit 130 or 140 and at a least one capacitor connected to an output terminal of the regulator 124. The maximum electric power may be used in the memory 150.

Size of reception intensity or sensitivity of the power electromagnetic wave received at the antenna 110 may change according to a distance between the reader 200 and the antenna. When the reception intensity of the electromagnetic wave is very great since the antenna 110 approaches the reader 200 so that the driving power is excessively amplified, a circuit failure due to overcurrent may occur.

The limiter 122 may limit the DC voltage so as not to exceed a predetermined maximum voltage required for driving each the circuit. In order not to generate an overvoltage, the reference generator 123 may perform circuit protection power limiting function that generates a reference voltage which is set according to the driving power required for the RFID circuit 130 and the UWB circuit 140.

Since the smart tag 100 includes a semiconductor integrated circuit (IC) device so that the smart tag is sensitive to a surrounding environment such as temperature or humidity, the regulator 124 may regulate voltage magnitude of the driving power input to the regulator according to the reference voltage so that the regulator supplies stable driving power to each the circuit. Some of the driving power may be stored in at least one capacitor connected to an output terminal of the regulator 124.

Since the UWB circuit 140 generates the UWB signal, a driving voltage for the UWB circuit may be designed to be greater than a driving voltage for the RFID circuit 130. To the present end, the no power circuit 120 may further include a voltage amplifier 125 for further amplifying the driving power output from the regulator 124 so that the no power circuit supplies the amplified driving power to the UWB circuit 140.

The RFID circuit 130 may include an amplitude shift keying (ASK) demodulator 131, a clock generator 132, and a backscattering modulator 133.

The ASK demodulator 131 may convert an analog signal received from the electromagnetic wave into a digital signal and may extract an operation command signal from the digital signal to transmit the operation command signal to the memory 150.

The clock generator 132 may generate a clock signal for synchronizing the RFID circuit 130 with the memory 150 in a response to an output voltage of the electromagnetic wave.

When the operation command signal is received at the memory 150, the memory 150 may transmit a signal including the tag ID and the part information to the backscattering modulator 133 in a response to the clock signal.

The backscattering modulator 133 may modulate the signal transmitted from the memory 150 to transmit the modulated signal through the antenna 110.

The RFID circuit 130 may minimize consumption of the driving power produced by the no power circuit 120 or may not use the driving power produced by the no power circuit by reflecting the electromagnetic wave energy received from the reader 200 through optimization or use of the backscattering modulator 133 to transmit a signal transmitted from the memory 150. In other words, since the no power circuit 120 may drive the UWB circuit 140 without a battery, the RFID circuit 130 may maximally use the power received from the reader 200 without storing the power in a capacitor to reduce consumption of the driving power.

The UWB circuit 140 may include a data generator 141, a switch driver 142, a delay component 143 such as a delay circuit, a discharge switch 144, a charge switch 145, and a pulse generator 146.

The data generator 141 may generate a wide bandwidth digital UWB signal (e.g., 0-1-0) for recognition of a position of the tag using the driving power.

The switch driver 142 may amplify a pulse value for long-distance transmission of the UWB signal by driving a switch generating a pulse corresponding to the UWB signal.

The delay component 143 may generate a delay signal for determining pulse bandwidth and transmission power of the UWB signal according to amplitude of transmission frequency. For example, a center frequency of the transmission frequency may be 3.5 GHz or 7 GHz.

The discharge switch 144 and the charge switch 145 may determine amplitude size of the pulse of the UWB signal output according to control of the switch driver 142. Transmission distance of the UWB signal may be changed according to the amplitude size of the pulse.

The pulse generator 146 may finally filter or generate pulse shape and pulse size of the UWB signal to transmit the filtered signal to the reader 200 through the antenna 110.

The UWB circuit 140 may minimize its power consumption and may increase its signal resolution by simplifying circuit modules and optimizing or adjusting the transmission frequency compared to an active UWB circuit.

As described above, the no power circuit 120 may generate a maximum power, and the RFID circuit 130 and the UWB circuit 140 may consume minimum power. Thus, the smart tag 100 may provide the part information and the position information related to the object to which the smart tag is attached through the reader 200.

Figure 4:
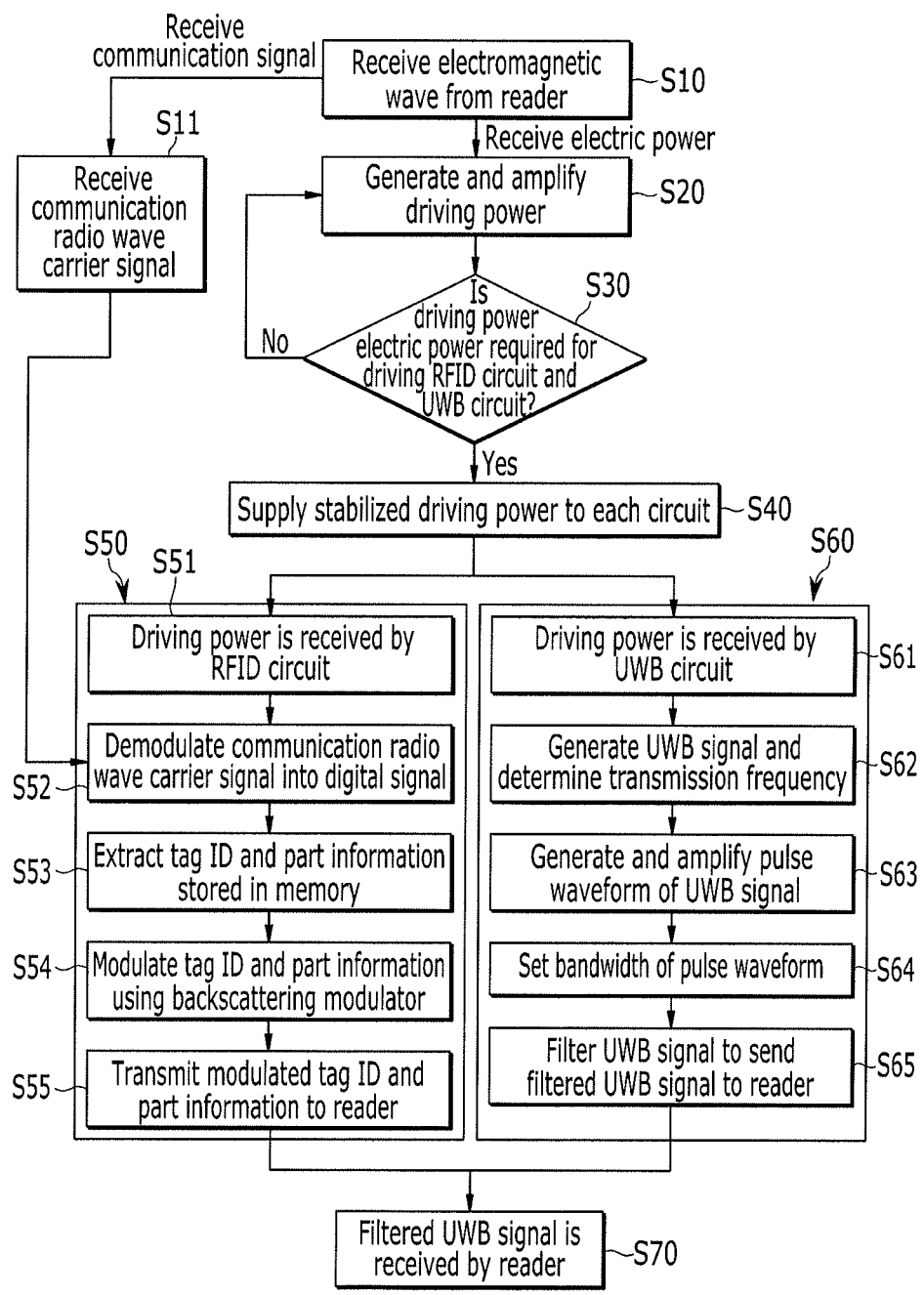
FIG. 4 is a flowchart illustrating an operation of the smart tag according to an exemplary embodiment of the present invention.

FIG. 4 is a flowchart illustrating an operation of the smart tag according to an exemplary embodiment of the present invention.

Referring to FIG. 4, the smart tag 100 may receive the electromagnetic wave transmitted from the reader 200 through the antenna 110 (step S10).

The smart tag 100 may generate and amplify the driving electric power using the electromagnetic induction phenomenon according to the electromagnetic wave reception (step S20).

When the driving power does not satisfy a power required for driving the RFID circuit 130 and the UWB circuit 140 (No in step S30), the smart tag 100 may continue to generate and amplify the driving power.

When the power required for driving the RFID circuit 130 and the UWB circuit 140 is satisfied (Yes in the step S30), the smart tag 100 may stabilize the driving power to supply the driving power to the circuits (step S40).

The smart tag 100 may read the tag ID and the part information stored in the memory 150 through the RFID circuit 130 according to the driving power to transmit the tag ID and the part information to the reader 200 via the antenna 110 (step S50).

The step S50 will be described in detail as follows.

When the driving power is received in the RFID circuit 130 (step S51), the smart tag 100 may demodulate a communication radio wave carrier signal received from the antenna 110 into a digital signal (steps S11 and S52).

The smart tag 100 may extract the tag ID and the part information stored in the memory 150 using the digital signal (step S53). The smart tag 100 may modulate the extracted tag ID and part information using the backscattering modulator 133 (step S54), and may transmit the modulated tag ID and part information to the reader via the antenna 110 (step S55).

The smart tag 100 may generate a wide bandwidth UWB signal for recognition of a position of the tag through the UWB circuit 140 according to the driving power supply simultaneously with the step S50, and may transmit the UWB signal to the reader 200 through the antenna 110 (step S60).

The step S60 will be described in detail as follows.

When the driving power is received in the UWB circuit 140 (step S61), the smart tag 100 may generate the wide bandwidth digital UWB signal (e.g., 0-1-0) for the position recognition using the driving power (step S61), and may determine the transmission frequency of the UWB signal (step S62).

The smart tag 100 may generate and amplify a pulse waveform of the UWB signal for long distance transmission (step S63), and may set the bandwidth of the pulse waveform (step S64).

The smart tag 100 may finally filter the pulse shape and the pulse size of the UWB signal using the pulse generator 146 to transmit the filtered signal to the reader 200 for the position recognition (step S65).

The smart tag 100 may collect the tag ID, the part information, and the UWB signal using the antenna 110, and may transmit the collected signals to the reader 200.

The reader 200 may detect the tag ID, the part information, and the position information related to the part based on the UWB signal received from the smart tag 100 (step S70).

The object recognition system using the smart tag 100 according to an exemplary embodiment of the present invention will be described on an assumption that the object recognition system is a facility of a vehicle production factory.

Figure 5:
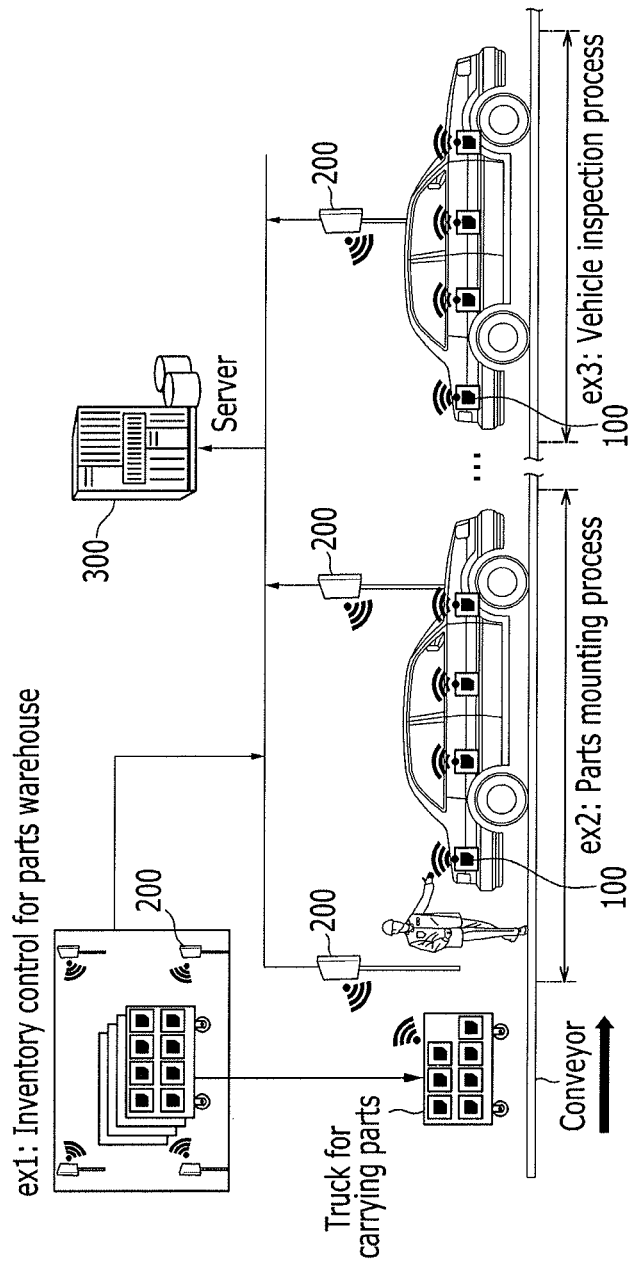
FIG. 5 shows an outline of a configuration of an object recognition system using the smart tag according to an exemplary embodiment of the present invention.

FIG. 5 shows an outline of a configuration of the object recognition system using the smart tag according to an exemplary embodiment of the present invention.

Referring to FIG. 5, the object recognition system may include smart tags 100 attached to various parts assembled in a vehicle, readers 200 that are disposed in the factory and recognize the smart tags via wireless communication, and a server 300 for detecting the part information and the position information related to the tags based on tag IDs and UWB signals received from the readers.

The reader 200 may be disposed near a warehouse for the parts and a conveyor of a production line for the vehicle, may recognize the smart tag 100 through a wireless signal, and may transmit the tag ID, the part information, and distance information received from the smart tag to the server 300.

The reader 200 may acquire the distance information based on the UWB signal received from the smart tag 100 located in a communication area. The distance information may include a distance between the reader 200 and the smart tag 100.

The server 300 may be a central system for controlling vehicle production in the factory, and may include a position tracker (or a position tracking device) for collecting information received from the reader 200 and recognizing the position information related to the smart tag 100 attached to the portion.

The server 300 may store coordinates of the readers 200 disposed in the factory and may recognize the part information and the position information related to the smart tag 100 disposed in the factory using the position tracker.

The server 300 may recognize the position information (x, y, and z coordinates) of the smart tag 100 in real time through triangulation in which the tag IDs and the USB signals of the readers 200 are used using the position tracker.

The server 300 may use the part information and the position information related to the smart tag 100 so that the server efficiently manages inventory states of the parts and installation states of parts according to a specification of the vehicle.

According to a first example, the server 300 may recognize a kind and a number of the parts located in the parts warehouse to automatically grasp the inventory states of the parts.

According to a second example, in the parts mounting process, the server 300 may prevent misplacement or no installation of the parts according to the specification of the vehicle by checking or confirming a transmission signal of the smart tag 100 and may manage the part installation history.

According to a third example, in an inspection process of a completed vehicle, the server 300 may detect misplacement or no installation of the parts according to the specification of the vehicle by automatically recognizing assembled parts applied to the vehicle through reading of the smart tag 100.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A passive smart tag attached for recognition of a part, the passive smart tag comprising:
    an antenna configured to receive electromagnetic wave from a reader;
    a no power circuit connected to the antenna and configured to amplify driving power generated by an electromagnetic induction phenomenon when the electromagnetic wave is received from the antenna;
    a radio frequency identification (RFID) circuit connected to the no power circuit and configured to read tag identification information related to the smart tag stored in a memory according to the driving power to transmit the tag identification information to the reader; and
    an ultra-wideband (UWB) circuit connected to the no power circuit and configured to generate an ultra-wideband signal used for recognition of a tag position in a response to the driving power to transmit the ultra-wideband signal to the reader.

2. The passive smart tag of claim 1,
    wherein the tag identification information and part information including at least one of production date, production company information, applied vehicle type, or specification information related to the part are stored in the memory.

3. The passive smart tag of claim 2,
    wherein the antenna is configured to receive the electromagnetic wave from the reader and to transmit the tag identification information transmitted from the RFID circuit and information transmitted from the UWB circuit to the reader.

4. The passive smart tag of claim 1, wherein the no power circuit includes:
    a first voltage multiplier configured to amplify an alternating current voltage applied thereto when the electromagnetic wave is received therein and to convert the alternating current voltage to a direct current voltage to output the driving power;

a limiter configured to limit the direct current voltage to not exceed a maximum voltage required for driving the radio frequency identification circuit and the ultra-wideband circuit;

a reference generator configured to generate a reference voltage required for driving the radio frequency identification circuit and the ultra-wideband circuit in order not to generate an overvoltage; and a regulator configured to regulate voltage magnitude of the driving power in accordance with the reference voltage so that the regulator supplies stable driving power to the radio frequency identification circuit and the ultra-wideband circuit.

5. The passive smart tag of claim 4, wherein the first voltage multiplier is configured to generate a maximum electric power which is used in the radio frequency identification circuit, the ultra-wideband circuit, and at a least one capacitor connected to an output terminal of the regulator.

6. The passive smart tag of claim 4, wherein the no power circuit further includes a second voltage amplifier configured to further amplify the driving power output from the regulator and supply an amplified driving power to the ultra-wideband circuit.

7. The passive smart tag of claim 1, wherein the radio frequency identification circuit includes:

an amplitude shift keying demodulator configured to convert an analog signal received from the electromagnetic wave into a digital signal and extract an operation command signal from the digital signal to transmit the operation command signal to the memory;

a clock generator configured to generate a clock signal for synchronizing the radio frequency identification circuit with the memory in a response to an output voltage of the electromagnetic wave; and a backscattering modulator configured to modulate a signal including the tag identification information transmitted from the memory to transmit a modulated signal through the antenna.

8. The passive smart tag of claim 7, wherein the radio frequency identification circuit is configured to reflect an electromagnetic wave energy received from the reader using the backscattering modulator to transmit a signal transmitted from the memory.

9. The passive smart tag of claim 7, wherein the memory is configured to transmit the signal including the tag identification information and part information to the backscattering modulator in a response to the clock signal when the operation command signal is received in the memory.

10. The passive smart tag of claim 1, wherein the ultra-wideband circuit includes:

a data generator configured to generate a digital ultra-wideband signal for the recognition of the tag position using the driving power;

a switch driver configured to amplify a pulse value for long-distance transmission of the ultra-wideband signal by driving a switch;

a delay component configured to generate a delay signal for determining pulse bandwidth and transmission power of the ultra-wideband signal in accordance with amplitude of transmission frequency;

a discharge switch and a charge switch configured to determine amplitude size of a pulse of the ultra-wideband signal output according to control of the switch driver; and a pulse generator configured to generate pulse shape and pulse size of the ultra-wideband signal to transmit the generated pulse shape and the pulse size of the ultra-wideband signal to the reader through the antenna.

11. The passive smart tag of claim 10, wherein transmission distance of the ultra-wideband signal is changed according to the amplitude size of the pulse of the ultra-wideband signal.

12. The passive smart tag of claim 1, wherein the smart tag is coated with a bar code label that covers an upper side of the smart tag and includes a bar code matched with the tag identification information, and wherein a sticker for attaching the smart tag to the part is bonded to a lower side of the smart tag.

13. An object recognition system configured to recognize part information and position information related to parts of a vehicle assembled in a vehicle production factory, the object recognition system comprising:

smart tags attached for recognition of the parts, wherein each of the smart tags includes an antenna configured to receive electromagnetic wave from a reader, a no power circuit connected to the antenna and configured to amplify driving power generated by an electromagnetic induction phenomenon when the electromagnetic wave is received, a radio frequency identification circuit connected to the no power circuit and configured to read tag identification information related to the smart tag stored in a memory according to the driving power to transmit the tag identification information to the reader, and an ultra-wideband circuit connected to the no power circuit and configured to generate an ultra-wideband signal used for recognition of a tag position in a response to the driving power to transmit the ultra-wideband signal to the reader;

readers that are disposed in the vehicle production factory and recognize the smart tags via wireless communication; and a server configured to detect the part information and the position information related to the smart tags based on identification information and ultra-wideband signals of the smart tags received from the readers.

14. The system of claim 13, wherein each of the readers is configured to transmit the tag identification information, information related to each of the parts, and distance information included in each of the ultra-wideband signals received from each of the smart tags to the server.

15. The system of claim 14, wherein the server includes a position tracker configured to store coordinates of the readers disposed in the vehicle production factory, and wherein the server is configured to recognize the position information related to the smart tags through triangulation in which the tag identification information and the ultra-wideband signals of the smart tags of the readers are used using the position tracker.

* * * * *